United States Patent
Feng et al.

(10) Patent No.: US 10,208,157 B2
(45) Date of Patent: Feb. 19, 2019

(54) ESTER RESINS

(71) Applicant: BLUE CUBE IP LLC, Midland, MI (US)

(72) Inventors: Yanli Feng, Shanghai (CN); Qiubai Peng, Shanghai (CN); Wei Du, Shanghai (CN); Zhidong Sheng, Shanghai (CN)

(73) Assignee: Blue Cube IP LLC, St. Louis, MO (US)

( * ) Notice: Subject to any disclaimer, the term of this patent is extended or adjusted under 35 U.S.C. 154(b) by 3 days.

(21) Appl. No.: 15/509,789

(22) PCT Filed: Sep. 11, 2014

(86) PCT No.: PCT/CN2014/086314
§ 371 (c)(1),
(2) Date: Mar. 8, 2017

(87) PCT Pub. No.: WO2016/037342
PCT Pub. Date: Mar. 17, 2016

(65) Prior Publication Data
US 2017/0253690 A1    Sep. 7, 2017

(51) Int. Cl.
*C08L 33/06* (2006.01)
*C08G 59/17* (2006.01)
*C08L 63/10* (2006.01)

(52) U.S. Cl.
CPC .......... *C08G 59/1466* (2013.01); *C08L 33/06* (2013.01); *C08L 33/068* (2013.01); *C08L 63/10* (2013.01); *C08L 2312/00* (2013.01)

(58) Field of Classification Search
CPC ...... C08G 59/1466; C08L 33/06; C08L 63/10
See application file for complete search history.

(56) References Cited

U.S. PATENT DOCUMENTS

| | | | | |
|---|---|---|---|---|
| 4,097,569 A | * | 6/1978 | Waters .................. | B29C 41/003 138/140 |
| 4,303,576 A | * | 12/1981 | Jackson, Jr. ....... | C08G 59/1461 523/508 |
| 4,898,965 A | * | 2/1990 | Kinoshita .......... | C08G 18/4277 558/302 |
| 2009/0299011 A1 | * | 12/2009 | Wang ..................... | C08G 81/02 525/190 |
| 2013/0123452 A1 | * | 5/2013 | Hage .................... | C08K 5/0025 526/281 |

* cited by examiner

*Primary Examiner* — Jeffrey C Mullis
(74) *Attorney, Agent, or Firm* — Husch Blackwell LLP

(57) ABSTRACT

A vinyl ester resin composition comprising a reaction product of: (a) a polyepoxide resin; (b) an unsaturated carboxylic acid; and (c) a reactive carboxyl group terminated amphiphilic block copolymer, a reactive epoxy group terminated amphiphilic block copolymer, or a mixture thereof; and a cured thermoset composite product produced from the above vinyl ester resin composition.

20 Claims, No Drawings

ESTER RESINS

FIELD

The present invention is related to a toughened vinyl ester resin composition; and more specifically, to a vinyl ester resin composition toughened with a carboxyl group terminated amphiphilic block copolymer and/or an epoxy group terminated amphiphilic block copolymer useful as a toughening agent for vinyl ester resins and unsaturated polyester resins.

BACKGROUND

Vinyl ester resins and unsaturated polyester resins are well known for having good thermal resistance properties (for example, a Tg of higher than 80° C.) and chemical resistance properties (for example, an acid resistance of less than 1 percent (%) for a time period of 28 days). When conventional epoxy vinyl ester resins and unsaturated polyester resins are cured to form, for example, a composite, the cured resins also display good mechanical properties, but such cured resins lack toughness and are very brittle upon cure. In addition, as the crosslink density or Tg of a cured vinyl ester resin product increases, the cured vinyl ester resin product requires an increase in toughness to provide a useful composite product.

U.S. Patent Application Publication No. 20070265373A1 (US20070265373A1) discloses the use of an amphiphilic block copolymer to toughen epoxy vinyl esters and unsaturated polyester resins; and a curable ester resin composition including (a) an ester resin; (b) at least one copolymerizable reactive monomer; and (c) an amphiphilic block copolymer containing at least one ester resin miscible block segment and at least one ester resin immiscible block segment. When the above ester resin composition is cured, the cured ester resin exhibits an increase in toughness. However, the toughener disclosed in US20070265373A1 is defined as a non-reactive type toughener, i.e., a toughening agent that does not react with the epoxy vinyl ester resin or the unsaturated polyester resin. The above composition containing the "non-reactive type" toughener suffers from the disadvantages of: (1) toughener migration and (2) poor acid resistance.

U.S. Pat. No. 8,021,586B2 (US '586) discloses an amphiphilic block copolymer-toughened epoxy resin and powder coatings made therefrom; including a curable solid resin composition useful for powder coating, wherein the resin composition includes (a) an epoxy resin; (b) an amphiphilic block copolymer containing an epoxy resin miscible block segment and an epoxy resin immiscible block segment; and (c) optionally, a curing agent. US '586 does not disclose a vinyl ester resin or an unsaturated polyester resin. Also, the above amphiphilic block copolymer is a "non-reactive" toughener; and is not a carboxyl group terminated amphiphilic block copolymer.

U.S. Patent Application Publication No. 2011/0319523A1 (US2011/0319523A1) discloses a thermosettable composition containing a combination of an amphiphilic block copolymer and a polyol; and a cured thermoset product prepared from the thermosettable composition. The thermosettable composition includes (a) an amphiphilic block copolymer, (b) a polyol, (c) an epoxy resin having oxirane rings, (d) an anhydride hardener containing an anhydride ring, and (e) a catalyst. US2011/0319523A1 does not teach a vinyl ester resin or an unsaturated polyester resin; or the use of a carboxyl group terminated amphiphilic block copolymer as a toughener.

U.S. Patent Application Publication No. 2011/0114257A1 (US2011/0114257A1) discloses reaction products based on an amphiphilic block copolymer and the use of an amphiphilic block copolymer as an impact modifier. The amphiphilic copolymer is based on ethylene oxide/butylene oxide (EO/BO) and used as an impact modifier component; and the final composition product is used for adhesive applications. US2011/0114257A1 does not teach: (1) a vinyl ester resin or the use of a carboxyl group terminated amphiphilic block copolymer as a toughener; (2) the synthesis of a vinyl ester resin using as toughener reacted into the backbone of the resin; or (3) a resin having excellent acid resistance performance or other beneficial properties other than toughness.

In *Journal of Polymer Science, Part B: Polymer Physics*, 2001, 39(23), 2996-3010, the authors of this article disclose that the use of a poly(ethylene oxide)-b-poly(ethylene-alt-propylene) (PEO-PEP) diblock copolymer provides micelle structures in cured epoxy resin thermoset systems, and that the block copolymers can self-assemble into vesicles and spherical micelles which can significantly increase the fracture resistance performance of the cured thermoset. The above article does not teach a vinyl ester resin or the use of a carboxyl group terminated amphiphilic block copolymer as a toughener. And, the above article does not teach the synthesis of a vinyl ester resin using as toughener reacted into the backbone of the resin. In addition, the above article does not disclose a resin having excellent acid resistance performance or other beneficial properties other than toughness.

SUMMARY

One embodiment of the present invention is directed to a vinyl ester resin formulation including a blend of: (a) at least one vinyl ester resin; and (b) a reactive carboxyl group terminated amphiphilic block copolymer, a reactive epoxy group terminated amphiphilic block copolymer, or a mixture thereof.

Another embodiment of the present invention is directed to a vinyl ester resin composite product comprising a reaction product of (a) the above blend and (b) a catalyst.

Still another embodiment of the present invention is directed to a vinyl ester resin formulation including a mixture of: (a) at least one polyepoxide resin; (b) at least one unsaturated carboxylic acid; and (c) a reactive carboxyl group terminated amphiphilic block copolymer, a reactive epoxy group terminated amphiphilic block copolymer, or a mixture thereof.

Yet another embodiment of the present invention is directed to a vinyl ester resin composition comprising a reaction product of: (a) at least one polyepoxide resin; (b) at least one unsaturated carboxylic acid; and (c) a reactive carboxyl group terminated amphiphilic block copolymer, a reactive epoxy group terminated amphiphilic block copolymer, or a mixture thereof; wherein an epoxy vinyl ester resin or an unsaturated polyester resin is formed; and wherein the reactive carboxyl group terminated amphiphilic block copolymer, the reactive epoxy group terminated amphiphilic block copolymer, or a mixture thereof is reacted into the backbone of the epoxy vinyl ester resin or an unsaturated polyester resin.

Even still another embodiment of the present invention is directed to a vinyl ester resin composite including a reaction product of: (a) the above vinyl ester resin composition and (b) a catalyst.

Even yet another embodiment of the present invention is directed to a cured thermoset product made from the above vinyl ester resin composition.

Even still other embodiments of the present invention are directed to processes for preparing the above vinyl ester resin formulations and compositions; and for preparing the above cured thermoset product.

Some of the advantages of the present invention include a cured thermoset product with improved tensile strength, improved elongation at break and improved impact strength without sacrificing the glass transition temperature (Tg) of the cured thermoset product made from the vinyl ester compositions above.

In addition, when the carboxyl group terminated amphiphilic or epoxy terminated block copolymer is reacted into the backbone of an epoxy vinyl ester resin or an unsaturated polyester resin, and the resultant product is cured, a cured product having excellent acid resistance is produced.

DETAILED DESCRIPTION

In one broad embodiment of the present invention, a vinyl ester resin formulation is prepared by blending: (a) at least one vinyl ester resin; and (b) a reactive carboxyl group terminated amphiphilic block copolymer, a reactive epoxy group terminated amphiphilic block copolymer, or a mixture thereof. In addition, the above blend can be reacted in the presence of a catalyst to form a vinyl ester resin composite product. By "reactive" herein, with reference to a material, it is meant that the material can be reacted into the chemical structure or backbone of another product structure.

In preparing the vinyl ester resin formulation blend of the present invention, at least one vinyl ester resin is used. For example, the vinyl ester resin can be an epoxy vinyl ester resin or an unsaturated polyester. The epoxy vinyl ester resins and unsaturated polyester resins useful in the present invention can be any of the conventional epoxy vinyl ester resins and unsaturated polyester resins known in the art. For example, the epoxy vinyl ester resins and the unsaturated polyester resins can be one or more of the epoxy vinyl ester resins or the unsaturated polyester resins described in U.S. Pat. No. 6,329,475, incorporated herein by reference.

The epoxy vinyl ester resins that can be employed in the vinyl ester resin formulation may be prepared by known processes such as (1) by reacting a polyepoxide with an ethylenically unsaturated carboxylic acid to produce a reaction product which contains, in part, the functional group produced by the interaction of an epoxide group with a carboxylic acid group, or (2) by further condensation of secondary hydroxyl groups contained in the above reaction product with a dicarboxylic acid anhydride to produce pendant half ester groups.

Examples of the epoxy vinyl ester resins which may be employed in the practice of the present invention can be commercially available resins sold under the trademark DERAKANE which is an epoxy vinyl ester resin that contains a predetermined amount of monomeric styrene.

Generally, the unsaturated polyester resins which can be used in the present invention can be an esterification product of (1) a dibasic acid or polybasic acid and (2) a divalent alcohol or polyvalent alcohol, wherein the di- or poly-basic acid and/or the di-poly-valent alcohol compound includes an unsaturated portion. Unsaturated carboxylic acid, polycarboxylic acid anhydride, polycarboxylic acid halide, polycarboxylic acid, and the like, and mixtures thereof can be used as the polybasic acid. And, typical polyhydric alcohols that may be employed include glycols, glycol ethers, and the like, and mixtures thereof.

Unsaturated polybasic acids or acid anhydrides can include for example phthalic acid, isophthalic acid, phthalic anhydride, terephthalic acid, adipic acid, sebacic acid, maleic acid, succinic acid, mellitic acid, tetrahydrophthalic anhydride, fumaric acid, citraconic, chloromaleic acid, allylsuccinic acid, itaconic acids, mesaconic acid, citric acid, pyromellitic acid, trimesic acid, tetrahydrophthalic acid, thiodiglycollic acid nadic anhydride, or mixtures thereof.

Polyvalent alcohols can include for example ethylene glycol, diethylene glycol, triethylene glycol, propylene glycol, dipropylene glycol, butylene glycol, diethylene glycol, polyethylene glycol, polypropylene glycol, 1,3-butanediol, 1,6-hexanediol, neopentyl glycol, 1,4-cyclohexanediol, 2-butene-1,4-diol, hydrogenated bisphenol A, bisphenoldioxyethyl ether, bisphenoldioxypropyl ether, neopentyl glycol; trivalent alcohols such as glycerin (glycerol); tetravalent alcohol such as pentaerythritol; or combinations thereof. Other examples of unsaturated polyhydric alcohols include without limitation butene diol, pentene diol, allyl or vinyl glycerol ether, allyl or vinyl pentaerythritol, and mixtures thereof.

The reactive carboxyl group terminated amphiphilic block copolymer, the reactive epoxy group terminated amphiphilic block copolymer, or the mixture thereof is also referred to herein as a "reactive toughener". In preparing the vinyl ester resin formulation blend of the present invention, the reactive toughener is useful to increase the toughness property of vinyl ester resins and unsaturated polyester resins when compared to vinyl ester resins and unsaturated polyester resins without the reactive toughener.

In general, the reactive toughener, component (b), for preparing the vinyl ester resin formulation blend of the present invention may include, for example, a reactive amphiphilic block copolymer which is made reactive by reacting (i) one or more amphiphilic block copolymers with (ii) an excess of a carboxylic compound or anhydride compound, or an excess of an epoxy compound; and (iii) optionally, in the presence of a catalyst.

The amphiphilic block copolymer can be for example polyether block copolymers comprising at least one epoxy miscible polyether block segment derived from an alkylene oxide such as ethylene oxide (EO) and at least one epoxy immiscible polyether block segment derived from an alkylene oxide such as for example 1,2-epoxy butane known commonly as butylene oxide (BO). The immiscible block segment may also be comprised of mixtures of $C_3$ or higher carbon analogue monomers that are copolymerized together to provide the immiscible block segment. Amphiphilic block copolymers useful in the present invention are disclosed, for example, in WO2006/052725; WO2006/052726; WO2006/052727; WO2006/052729; WO2006/052730; WO2005/097893; U.S. Pat. Nos. 6,887,574 and 7,923,073; and U.S. Patent Application Publication No. 20040247881; all which are incorporated herein by reference.

Examples of the epoxy resin miscible polyether block segment include a polyethylene oxide block, a propylene oxide block, a poly(ethylene oxide-co-propylene oxide) block, a poly(ethylene oxide-ran-propylene oxide) block, or mixtures thereof. Preferably, the epoxy resin miscible polyether block segment useful in the present invention can be a polyethylene oxide block.

Examples of the epoxy resin immiscible polyether block segment include a polybutylene oxide block, a polyhexylene oxide block derived from 1,2-epoxy hexane, a polydodecylene oxide block derived from 1,2-epoxy dodecane, or mixtures thereof. Preferably, the epoxy resin immiscible polyether block segment useful in the present invention can be a polybutylene oxide block.

The amphiphilic polyether block copolymers which can be employed in the practice of the present invention can include for example, but are not limited to, a diblock copolymer, a linear triblock, a linear tetrablock, other multiblock structures, a branched block structure, or star block structure.

Preferred examples of suitable block copolymers useful in the present invention include amphiphilic polyether diblock copolymers such as, for example, poly(ethylene oxide)-b-poly(butylene oxide)(PEO-PBO) or amphiphilic polyether triblock copolymers such as, for example, poly(ethylene oxide)-b-poly(butylene oxide)-b-poly(ethylene oxide) (PEO-PBO-PEO).

Commercially available amphiphilic polyether block copolymers can also be used in the present invention including for example, the amphiphilic polyether block copolymer sold under the tradename FORTEGRA™ 100 and FORTERA™ 202 which is a polyol derivative commercially available from The Dow Chemical Company.

The anhydride compound or the carboxylic compound useful for preparing the reactive carboxyl group terminated amphiphilic block copolymer, which in turn, is useful for producing the vinyl ester resin formulation blend, as component (b), of the present invention may include one or more conventional anhydride compounds or carboxylic compounds. For example, the anhydride compound or carboxylic compound useful for preparing the reactive carboxyl group terminated amphiphilic block copolymer can include methylhexahydrophthalic anhydride, methyl tetrahydrophthalic anhydride, dicarboxylic acid, and mixtures thereof.

The epoxy compound useful for preparing the reactive epoxy group terminated amphiphilic block copolymer, which in turn, is useful for producing the vinyl ester resin formulation blend, as component (b), of the present invention may include one or more conventional epoxy compounds, for example, bisphenol A type epoxy compounds, novolac type epoxy compounds, aliphatic type epoxy compounds and mixtures thereof.

As aforementioned, the reactive toughener, component (c), can also include a combination or mixture of a reactive carboxyl group terminated amphiphilic block copolymer and a reactive epoxy group terminated amphiphilic block copolymer.

In general, the amount or concentration of the reactive toughener, component (c), used for preparing the vinyl ester resin formulation blend of the present invention, may be for example, from about 5 weight percent (wt %) to about 10 wt % in one embodiment, from about 3 wt % to about 20 wt % in another embodiment; from about 1 wt % to about 30 wt % in still another embodiment; and from about 0.1 wt % to about 40 wt % in yet another embodiment, based on the total weight of the composition.

The reaction for producing the reactive toughener may be conducted in the presence of a catalyst, for example, an amine catalyst. Suitable amine catalysts may include benzyldimethylamine, triethylamine, diethyl aminopropylamine, or mixtures thereof.

In general, the concentration of the catalyst, component (iii), used for preparing the reactive toughener of the present invention, may be for example, from 0 wt % to about 10 wt % in one embodiment, from about 0.01 wt % to about 5 wt % in another embodiment; and from about 0.1 wt % to about 3 wt % in still another embodiment; based on the total weight of the composition including components (i), (ii) and (iii).

In general, the reactive carboxyl group terminated or epoxy terminated amphiphilic block copolymer may be prepared by reacting components (i), (ii) and optionally (iii). The reaction can be conducted at a temperature from about 60° C. to about 160° C. in one embodiment, from about 80° C. to about 140° C. in another embodiment, and from about 100° C. to about 120° C. in still another embodiment.

In preparing the reactive toughener, the mole ratio of the carboxylic acid to the amphiphilic block copolymer may be from about 20:1 to about 1:1 in one embodiment, from about 10:1 to about 1:1 in another embodiment, and from about 5:1 to about 1:1 in still another embodiment.

In a preferred embodiment, the amphiphilic block copolymer is fully reacted with the carboxylic acid to obtain a reactive carboxyl group terminated amphiphilic block copolymer.

In an alternate embodiment, to prepare the reactive epoxy terminated amphiphilic block copolymer toughener, an epoxy compound is reacted with the above described reactive carboxyl group terminated amphiphilic block copolymer. For example, the mole ratio of the epoxy resin to the carboxyl group terminated amphiphilic block copolymer may be from about 20:1 to about 1:1 in one embodiment, from about 10:1 to about 1:1, in another embodiment, and from about 5:1 to about 1:1 in still another embodiment such that a reactive epoxy group terminated amphiphilic block copolymer is formed.

The process for preparing the vinyl ester resin formulation blend of the present invention includes admixing (a) the at least one ester resin described above and (b) the reactive toughener agent described above. The formulation may include other optional additives such as (c) a catalyst or an initiator; and/or (c) other additives such as curing agents or fillers.

For example, the preparation of the vinyl ester resin formulation blend is achieved by blending, in known mixing equipment, the ester resin described above, the reactive toughener agent described above, and optionally any other desirable additive or ingredient, for example a curing catalyst, may be added to the formulation during the mixing or prior to the mixing to form the formulation.

Components (a) and (b) described above may be blended together using a speed mixer at room temperature (about 25° C.), and then the blended materials can be further processed or cured to form a composite. For example the blended formulation can be used for preparing cured castings for performance testing as illustrated in the Examples herein below.

All the compounds of the vinyl ester resin formulation blend are typically mixed and dispersed at a temperature enabling the preparation of an effective vinyl ester resin formulation blend having the desired balance of properties for a particular application. For example, the temperature during the mixing of all components may be generally from about −10° C. to about 40° C. in one embodiment, and from about 10° C. to about 30° C. in another embodiment.

The preparation of the vinyl ester resin formulation blend of the present invention, and/or any of the steps thereof, may be a batch or a continuous process. The mixing equipment used in the process may be any vessel and ancillary equipment well known to those skilled in the art.

As aforementioned, a vinyl ester resin composite product can be produced by reacting the following components in a reaction mixture: (a) the vinyl ester resin formulation blend described above in the presence of (b) a catalyst to form the vinyl ester resin composite product.

The vinyl ester resin formulation blend useful in forming the vinyl ester resin composite product is as described above.

The catalyst compound or initiator used to react with the vinyl ester resin formulation blend to form the vinyl ester resin composite product may include for example, but is not limited to, peroxides, azo compounds, aniline derivatives, acetamides, or other compounds that produce free radicals by the application of heat, radiation, or chemical promotion; or combinations thereof.

In one embodiment, the catalyst compound or initiator may include for example, but is not limited to, methyl ethyl ketone peroxide, cumene hydroperoxide, benzoyl peroxide, t-butyl hydroperoxide, t-butylperbenzoate, cobalt, vanadium, or lead naphthenates, or lead octoates, N,N-dimethylaniline, N,N-diethyl aninline, N,N-dimethylacetoacetamide, N,N-diethylacetoacetamide, or combinations thereof.

Generally, the amount of the optional catalyst or initiator, when used in the present invention, may be for example, from about 0.01 wt % to about 10 wt % in one embodiment, from about 0.05 wt % to about 5 wt % in another embodiment; and from about 0.1 wt % to about 2.5 wt % in still another embodiment; based on the total weight of the composition.

In preparing the vinyl ester resin composite product described above, the reaction mixture of a vinyl ester resin formulation blend and catalyst may also optionally include another vinyl ester resin, as a second ester resin, different from the vinyl ester resin formulation blend (the first ester resin). For example, the second vinyl ester resin can be bis-A type epoxy based vinyl ester resin, novolac type epoxy based vinyl ester resin, polyurethane modified vinyl ester resin or mixture of them.

Generally, the amount of second vinyl ester resin, when used in the present invention, can be for example from 0 wt % to about 80 wt % in one embodiment, from about 0.01 wt % to about 50 wt % in another embodiment; and from about 0.1 wt % to about 30 wt % in still another embodiment.

In preparing the vinyl ester resin composite product described above, the reaction mixture of a vinyl ester resin formulation blend and catalyst may also optionally include a copolymerizable reactive monomer to lower the viscosity of the vinyl ester resin formulation blend further. For example, the copolymerizable reactive monomer used can be styrene, chlorostyrenes; methyl styrenes; vinyl benzyl chloride; divinyl benzene; indene; allyl styrene and allyl benzene; unsaturated esters such as methyl methacrylate, methyl acrylate; vinyl toluene; amides such as acrylamides, vinyl chloride and mixtures thereof. Among the above copolymerizable reactive monomers, styrene is preferred.

Generally, the amount of copolymerizable reactive monomer, when used in the present invention, may be for example, from about 5 wt % to about 60 wt % in one embodiment, from about 10 wt % to about 60 wt % in another embodiment; and from about 20 wt % to about 50 wt % in still another embodiment; based on the total weight of the composition.

The reaction mixture of a vinyl ester resin formulation blend and catalyst described above may also optionally include other component or additive(s) useful for their indented purpose and well known by those skilled in the art can be used in the above described reaction mixture, including for example fillers, dyes, pigments, thixotropic agents, surfactants, fluidity control agents, stabilizers, diluents, adhesion promoters, flexibilizers, other toughening agents or fire retardants.

Generally, the amount of the optional additive(s), when used in the present invention, may be for example, from 0 wt % to about 80 wt % in one embodiment, from about 0.01 wt % to about 70 wt % in another embodiment; and from about 0.1 wt % to about 60 wt % in still another embodiment; based on the total weight of the composition.

The vinyl ester resin composite product of the present invention comprises the reaction product made from the following components in a reaction mixture: (a) the vinyl ester resin formulation blend as described above; and (b) the catalyst compound as described above. The vinyl ester resin composite product is essentially a cured thermoset product and the curing process can be carried out at a predetermined temperature and for a predetermined period of time sufficient to cure the above reaction mixture.

For example, the curing reaction can be conducted at a temperature from about 40° C. to about 300° C. in one embodiment, from about 60° C. to about 250° C. in another embodiment, and from about 80° C. to about 200° C. in still another embodiment.

For example, the curing reaction can be conducted for a period of reaction time of from about 20 seconds to about 30 days in one embodiment, from about 1 minute to about 24 hours in another embodiment, and from about 5 minutes to about 12 hours in still another embodiment.

In another embodiment of the present invention, a vinyl ester resin formulation mixture is provided including the following compounds: (a) at least one polyepoxide resin; (b) at least one unsaturated carboxylic acid; and (c) a reactive carboxyl group terminated amphiphilic block copolymer, a reactive epoxy group terminated amphiphilic block copolymer, or a mixture thereof. The vinyl ester resin formulation mixture can include various optional additives and optional components such as for example (d) a catalyst.

In preparing the vinyl ester resin formulation mixture of the present invention, at least one epoxy or polyepoxide compound starting material, component (a), can be used. The epoxy resins useful in the present invention may be selected from any known epoxy resin in the art; and may include conventional and commercially available epoxy resins, which may be used alone or in combinations of two or more. For example, an extensive enumeration of epoxy resins useful in the curable resin composition of the present invention includes epoxides described in Pham et al., *Epoxy Resins* in the Kirk-Othmer Encyclopedia of Chemical Technology; John Wiley & Sons, Inc.: online Dec. 4, 2004 and in the references therein; in Lee, H. and Neville, K., *Handbook of Epoxy Resins*, McGraw-Hill Book Company, New York, 1967, Chapter 2, pages 2-1 to 2-27, and in the references therein; May, C. A. Ed. *Epoxy Resins: Chemistry and Technology*, Marcel Dekker Inc., New York, 1988 and in the references therein; and in U.S. Pat. No. 3,117,099; all which are incorporated herein by reference.

In selecting epoxy resins for the vinyl ester resin formulation mixture disclosed herein, consideration should not only be given to properties of the final product, but also to viscosity and other properties that may influence the processing of the resin composition. In one embodiment, particularly suitable epoxy resins useful in the present invention are based on reaction products of polyfunctional alcohols, polyglycols, phenols, cycloaliphatic carboxylic acids, aromatic amines, or aminophenols with epichlorohydrin. Other suitable epoxy resins useful for the compositions disclosed herein include reaction products of epichlorohydrin with o-cresol and epichlorohydrin with phenol novolacs. In another embodiment, the epoxy resin useful in the present invention for the preparation of the vinyl ester resin formulation mixture may be selected from commercially available products, such as for example, D.E.R.® 330, D.E.R. 331, D.E.R. 332, D.E.R. 324, D.E.R. 352, D.E.R. 354, D.E.R. 383, D.E.R. 542, D.E.R. 560, D.E.N.® 425, D.E.N. 431, D.E.N. 438, D.E.R. 542, D.E.R. 560, D.E.R. 736, D.E.R. 732 or mixtures thereof. D.E.R resins are commercially available from The Dow Chemical Company.

A few non-limiting embodiments of the epoxy resin useful as a compound in the vinyl ester resin formulation mixture of the present invention may include, for example, bisphenol A diglycidyl ether, tetrabromobisphenol A diglycidyl ether, bisphenol F diglycidyl ether, resorcinol diglycidyl ether, triglycidyl ethers of para-aminophenols, epoxy novolacs, divinylarene dioxides, and mixtures thereof.

Examples of preferred embodiments for the epoxy resin include bisphenol A diglycidyl ether, epoxy novolac resins, and mixtures thereof. The preferred epoxy compound may also be selected from, but are not limited to, commercially available epoxy resin products such as for example D.E.R.383, D.E.R.330, D.E.R.331 and D.E.N.438 which are epoxy resins available from The Dow Chemical Company.

Generally, the amount of epoxy resin compound useful in the vinyl ester resin formulation mixture of the present invention, may be for example, from about 5 wt % to about 80 wt % in one embodiment, from about 20 wt % to about 60 wt % in another embodiment; from about 10 wt % to about 30 wt % to about 50 wt % 70 wt % in still another embodiment; and from about in yet another embodiment, based on the total weight of the composition.

The unsaturated carboxylic acid compound useful for producing the vinyl ester resin formulation mixture of the present invention can be for example methacrylic acid (MAA), acrylic acid, an unsaturated acid with double bond, or a combination thereof.

Generally, the amount of carboxylic acid compound used in the vinyl ester resin formulation mixture of the present invention, may be for example, from about 3 wt % to about 50 wt % in one embodiment, from about 5 wt % to about 40 wt % in another embodiment; and from about 10 wt % to about 30 wt % in still another embodiment based on the total weight of the composition.

The reactive carboxyl group terminated amphiphilic block copolymer, the reactive epoxy group terminated amphiphilic block copolymer, or the mixture thereof (herein referred to as the "reactive toughener") useful for producing the vinyl ester resin formulation mixture of the present invention may include, for example, an amphiphilic block copolymer made reactive by reacting (i) one or more amphiphilic block copolymers with (ii) an excess of a carboxylic compound or with an excess of an epoxy compound.

The amphiphilic block copolymer can be for example polyether block copolymers comprising at least one epoxy miscible polyether block segment derived from an alkylene oxide such as ethylene oxide (EO) and at least one epoxy immiscible polyether block segment derived from an alkylene oxide such as for example 1,2-epoxy butane known commonly as butylene oxide (BO). The immiscible block segment may also be comprised of mixtures of $C_3$ or higher carbon analogue monomers that are copolymerized together to provide the immiscible block segment. Amphiphilic block copolymers useful in the present invention are disclosed, for example, in WO2006/052725; WO2006/052726; WO2006/052727; WO2006/052729; WO2006/052730; WO2005/097893; U.S. Pat. Nos. 6,887,574 and 7,923,073; and U.S. Patent Application Publication No. 20040247881; all which are incorporated herein by reference.

Examples of the epoxy resin miscible polyether block segment include a polyethylene oxide block, a propylene oxide block, a poly(ethylene oxide-co-propylene oxide) block, a poly(ethylene oxide-ran-propylene oxide) block, or mixtures thereof. Preferably, the epoxy resin miscible polyether block segment useful in the present invention can be a polyethylene oxide block.

Examples of the epoxy resin immiscible polyether block segment include a polybutylene oxide block, a polyhexylene oxide block derived from 1,2-epoxy hexane, a polydodecylene oxide block derived from 1,2-epoxy dodecane, or mixtures thereof. Preferably, the epoxy resin immiscible polyether block segment useful in the present invention can be a polybutylene oxide block.

The amphiphilic polyether block copolymers which can be employed in the practice of the present invention can include for example, but are not limited to, a diblock copolymer, a linear triblock, a linear tetrablock, other multiblock structures, a branched block structure, or star block structure.

Preferred examples of suitable block copolymers useful in the present invention include amphiphilic polyether diblock copolymers such as, for example, poly(ethylene oxide)-b-poly(butylene oxide)(PEO-PBO) or amphiphilic polyether triblock copolymers such as, for example, poly(ethylene oxide)-b-poly(butylene oxide)-b-poly(ethylene oxide) (PEO-PBO-PEO).

Commercially available amphiphilic polyether block copolymers can also be used in the present invention including for example, the amphiphilic polyether block copolymer sold under the tradename FORTEGRA™ 100 and FORTERA™ 202 which is a polyol derivative commercially available from The Dow Chemical Company.

The carboxylic compound useful for preparing the reactive carboxyl group terminated amphiphilic block copolymer, which in turn, is useful for producing the vinyl ester resin formulation mixture of the present invention may include, for example, one or more of the carboxylic compounds or epoxy compounds described above.

The mole ratio of the amphiphilic polyether block copolymer to the carboxylic compound to form the reactive carboxyl group terminated amphiphilic block copolymer can be for example from about 0.01 to about 1 in one embodiment, from about 0.1 to about 0.9 in another embodiment, and from about 0.5 to about 0.8 in still another embodiment.

The epoxy compound useful for preparing the reactive epoxy group terminated amphiphilic block copolymer, which in turn, is useful for producing the vinyl ester resin formulation mixture of the present invention may include, for example, one or more of the epoxy compounds described above such as bisphenol A diglycidyl ether, epoxy novolac resins, aliphatic epoxy resins, or mixtures thereof.

The mole ratio of the amphiphilic polyether block copolymer to the epoxy compound to form the reactive epoxy group terminated amphiphilic block copolymer, can be for example from about 0.01 to about 1 in one embodiment, from about 0.1 to about 0.9 in another embodiment, and from about 0.5 to about 0.8 in still another embodiment.

In general, the amount or concentration of the reactive amphiphilic block copolymer compound, component (c), used in the present invention may be for example, from about 5 wt % to about 10 wt % in one embodiment, from about 3 wt % to about 20 wt % in another embodiment; from about 1 wt % to about 30 wt % in still another embodiment;

and from about 0.1 wt % to about 40 wt % in yet another embodiment, based on the total weight of the composition.

The process for preparing the vinyl ester resin formulation reaction mixture of the present invention includes admixing the following compounds: (a) the at least one polyepoxide resin described above; (b) the at least one unsaturated carboxylic acid described above; and (c) the reactive toughener described above. The vinyl ester resin formulation mixture can include various optional additives and optional components such as for example (d) a catalyst, and/or other additives such as curing agents or fillers.

For example, the preparation of the vinyl ester resin formulation reaction mixture is achieved by admixing the components, in known mixing equipment, including (a) the at least one polyepoxide resin described above; (b) the at least one unsaturated carboxylic acid described above; (c) the reactive toughener described above; and (d) optionally any other desirable additive or ingredient, for example a catalyst. The optional additives may be added to the reaction mixture during the mixing or prior to the mixing to form the vinyl ester resin formulation reaction mixture.

All the compounds of the vinyl ester resin formulation reaction mixture are typically mixed and dispersed at a temperature enabling the preparation of an effective vinyl ester resin formulation mixture having the desired balance of properties for a particular application. For example, the temperature during the mixing of all components may be generally from about $-10°$ C. to about $40°$ C. in one embodiment, and from about $10°$ C. to about $30°$ C. in another embodiment.

The preparation of the vinyl ester resin formulation mixture of the present invention, and/or any of the steps thereof, may be a batch or a continuous process. The mixing equipment used in the process may be any vessel and ancillary equipment well known to those skilled in the art.

Another embodiment of the present invention is directed to a vinyl ester resin reaction product composition includes a reaction product of: (a) at least one polyepoxide resin; (b) at least one unsaturated carboxylic acid; and (c) a reactive carboxyl group terminated amphiphilic block copolymer, a reactive epoxy group terminated amphiphilic block copolymer, or a mixture thereof.

The components: (a) the at least one polyepoxide resin; (b) the at least one unsaturated carboxylic acid; and (c) the reactive toughener; and their concentrations used to form the vinyl ester resin reaction product composition have been described above with reference to the vinyl ester resin formulation reaction mixture.

When the above reaction mixture is reacted to form a composition, the resultant vinyl ester resin reaction product composition includes an epoxy vinyl ester resin or an unsaturated polyester resin wherein the reactive carboxyl group terminated amphiphilic block copolymer, a reactive epoxy group terminated amphiphilic block copolymer, or a mixture thereof is reacted into the backbone of the epoxy vinyl ester resin or an unsaturated polyester resin. The produced epoxy vinyl ester resin or an unsaturated polyester resin with its backbone structure including the reactive carboxyl group terminated amphiphilic block copolymer, the reactive epoxy group terminated amphiphilic block copolymer, or a mixture thereof can also be referred to herein as a "modified ester resin".

The above reaction mixture to form the vinyl ester resin reaction product composition or modified ester resin, may include as an optional component, another or second vinyl ester resin different from the modified ester resin. For example, the second vinyl ester resin may include a bisphenol A type epoxy based vinyl ester resin, a novolac type epoxy based vinyl ester resin, a polyurethane modified vinyl ester resin, or mixtures thereof.

Generally, the amount of second vinyl ester resin, when used in the present invention, can be for example from 0 wt % to about 80 wt % in one embodiment, from about 0.01 wt % to about 50 wt % in another embodiment; and from about 0.1 wt % to about 30 wt % in still another embodiment.

In another embodiment, the above reaction mixture to form the vinyl ester resin reaction product composition or modified ester resin, may also include, as an optional component, a copolymerizable reactive monomer. For example, the copolymerizable reactive monomer used can be styrene, an alkyl styrene, a divinylarene such as divinylbenzene, and combinations thereof.

Generally, the amount of copolymerizable reactive monomer, when used in the present invention, can be for example from about 5 wt % to about 60 wt % in one embodiment, from about 10 wt % to about 50 wt % in another embodiment; and from about 20 wt % to about 40 wt % in still another embodiment.

The reaction to form the modified ester resin can be conducted at a temperature from about $60°$ C. to about $160°$ C. in one embodiment, from about $80°$ C. to about $140°$ C. in another embodiment, and from about $100°$ C. to about $120°$ C. in still another embodiment. And, the reaction is carried out for a period of reaction time of from about 0.5 hour to about 5 hours in one embodiment, from about 1 hour to about 4 hours in another embodiment, and from about 2 hours to about 3 hours in still another embodiment.

The above reaction for preparing the modified ester resin may be conducted in the presence of a catalyst, for example, an amine catalyst. Suitable amine catalysts may include benzyldimethylamine, triethylamine, diethyl aminopropylamine or mixtures thereof.

Another embodiment of the present invention includes preparing a vinyl ester resin composite product reaction mixture by admixing the following components in a reaction mixture: (a) the modified ester resin described above, and (b) a catalyst. Then the reaction mixture is reacted under conditions to form the vinyl ester resin composite product.

The modified ester resin used to prepare the vinyl ester resin composite product reaction mixture is the same modified ester resin as described above.

In preparing the vinyl ester resin composite product reaction mixture, generally, the amount of the modified ester resin used may be, for example, from about 5 wt % to about 95 wt % in one embodiment, from about 10 wt % to about 90 wt % in another embodiment; and from about 20 wt % to about 80 wt % in still another embodiment; based on the total weight of the composition.

The catalyst compound used to prepare the vinyl ester resin composite product reaction mixture is the same catalyst compound as described above with reference to forming the composite product from the vinyl ester resin formulation blend. For example, but is not limited to, the catalyst can be selected from the group consisting of peroxides, azo compounds, aniline derivatives, acetamides, or other compounds that produce free radicals by the application of heat, radiation, or chemical promotion; or combinations thereof.

Generally, the amount of catalyst, used in the present invention, can be for example from about 0.01 wt % to about 10 wt % in one embodiment, from about 0.05 wt % to about 5 wt % in another embodiment; and from about 0.1 wt % to about 2.5 wt % in still another embodiment.

In preparing the vinyl ester resin composite product reaction mixture, the reaction mixture may include one or more optional compounds for example any of the above optional components described above including another or second vinyl ester resin different from the modified ester resin; a copolymerizable reactive monomer; and mixtures thereof.

Another embodiment of the present invention includes producing a vinyl ester resin composite product from the above described vinyl ester resin composite product reaction mixture. The composite product of the present invention can also be referred to herein as a thermoset or a cured article.

The process of reacting the composite product reaction mixture or formulation (i.e., curing of the reaction mixture) may be carried out at a predetermined temperature and for a predetermined period of time sufficient to cure the formulation. The curing may be dependent on the hardener and/or other optional additives included in the formulation. However, adjustments to the formulation can be made by one skilled in art depending on the desired enduse product to be manufactured.

The curing temperature of the above curable formulation to form the cured product (e.g. the casting samples in the Examples below) can be at a curing temperature above about 60° C. in one embodiment, above about 80° C. in another embodiment, and above about 100° C. in still another embodiment. In another embodiment, the temperature of curing the formulation may be generally from about 60° C. to about 200° C.; from about 80° C. to about 190° C. in still another embodiment; from about 100° C. to about 180° C. in yet another embodiment; and from about 125° C. to about 175° C. in even still another embodiment.

Generally, the curing time for the process of curing the curable formulation may be chosen from several minutes to several hours. For example, the curing time can be generally from about 1 minute to about 24 hours in one embodiment, from about 5 minutes to about 12 hours in another embodiment, and from about 10 minutes to about 1 hour in still another embodiment. Below a period of time of about 1 minute, the time may be too short to ensure sufficient reaction under conventional processing conditions; and above about 24 hours, the time may be too long to be practical or economical.

The curable vinyl ester resin reaction mixture of the present invention may be used to manufacture a cured thermoset product for various applications. The cured composite vinyl ester resin product (i.e. the cross-linked product made from the curable formulation comprising the vinyl ester resin composite product reaction mixture) of the present invention shows several improved properties over conventional cured thermosets made from conventional vinyl ester resin formulation. For example, the cured composite product of the present invention may advantageously have a high glass transition temperature (Tg).

For example, the composite product of the present invention exhibits a glass transition temperature generally of between about 100° C. and about 200° C. in one embodiment, between about 80° C. and about 220° C. in another embodiment, and between about 40° C. and about 250° C. in still another embodiment. The Tg of the composite product can be measured by the method described in test method section herein below.

In addition, the vinyl ester resin composite product of the present invention advantageously exhibits several improved properties including for example an increase in tensile strength, an increase in elongation at break, an increase in impact strength; and an increase in acid resistance, without exhibiting a substantially decrease in glass transition temperature (Tg).

For example, the cured composite product of the present invention exhibits a tensile strength of generally from about 40 MPa to about 80 MPa in one embodiment, from about 30 MPa to about 90 MPa in another embodiment, and from about 20 MPa to about 100 MPa in still another embodiment. The tensile strength of the cured composite product can be measured by the method described in test method section herein below.

For example, the cured composite product of the present invention exhibits an elongation at break of generally from about 2% to about 5% in one embodiment, from about 1% to about 10% in another embodiment, and from about 0.5% to about 20% in still another embodiment. The elongation at break of the cured composite product can be measured by the method described in the test method section herein below.

Also, the cured composite product of the present invention exhibits an impact strength of for example generally from about 10 kJ/m$^2$ to about 30 kJ/m$^2$ in one embodiment, from about 5 kJ/m$^2$ to about 40 kJ/m$^2$ in another embodiment, and from about 3 kJ/m$^2$ to about 50 kJ/m$^2$ in still another embodiment. The impact strength of the cured composite product can be measured by the method described in test method section herein below.

In addition, when the carboxyl group terminated amphiphilic block copolymer or epoxy terminated amphiphilic block copolymer is reacted into the backbone of the vinyl ester resin; the cured composite product of the present invention exhibits an increase in its acid resistance property. An excellent acid resistance property ideally should be at 0% weight change within a 28-day test period. However, generally, in one preferred embodiment, the acid value of the composite product may be from 0% to less than or equal to 1% weight change within a 28-day test period; from 0% to about 0.8% weight change within a 28-day test period in another embodiment, from 0% to about 0.6% weight change within a 28-day test period in still another embodiment, and from about 0% to about 0.5% weight change within a 28-day test period in yet another embodiment. The acid resistance of the cured composite product can be measured by the method described in test method section herein below.

The curable vinyl ester resin formulation and the cured product of the present invention can be used in various applications including for example coatings, adhesives, composites, and casting. Also, the above beneficial properties of the cured product can be measured as required based on the desired end use of the curable formulation and the cured product. For example, the curable epoxy resin formulation of the present invention can be used for preparing a composite, such as tank vessels, wherein the cured product exhibits a combination, i.e. a balance, of advantageous properties required for such composites including for example processability, Tg, mechanical performance and chemical resistance performance.

EXAMPLES

The following examples and comparative examples further illustrate the present invention in detail but are not to be construed to limit the scope thereof.

Various terms and designations used in the following examples are explained and described in Table I as follows:

TABLE I

Materials

| Material | EEW/Mn | Function | Main Composition | Supplier |
|---|---|---|---|---|
| D.E.N.™ 438 | EEW = 179 g/eq | | novolac epoxy | The Dow Chemical Company |
| FORTEGRA 202 ("F202") | Mn = 7885 | toughener | carboxyl group terminated amphiphilic block copolymer | The Dow Chemical Company |
| FORTEGRA 100 ("F100") | Mn =7000 | toughener | amphiphilic block copolymer | The Dow Chemical Company |
| MFE 780 | NA | | novolac type vinyl ester resin | Huachang Polymer Company |
| HYPRO 1300*8 | NA | toughener | carboxyl terminated butadiene-acrylonitrile (CTBN) | CVC Specialty Chemicals, Inc. |
| 438-VER | NA | | EEW is 13,190 and acid value is 2 mg KOH/g. | lab prepared |
| 438-F202-VER | NA | | EEW is 10,037 and acid value is 3 mg KOH/g. | lab prepared |
| 438-CTBN-VER | NA | | EEW is 10,001 and acid value is 4 mg KOH/g. | lab prepared |
| methacrylic acid (MAA) | Mn = 86 g/mol | | 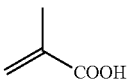 | Sinopharm |
| Hycat 3000S | NA | catalyst | catalyst containing trivalent chromium carboxylate complex | Dimension Technology Chemical Systems, Inc. |
| DMP-30 (tris-(dimethylamino-methyl) phenol) | Mn = 265.4 g/mol | | 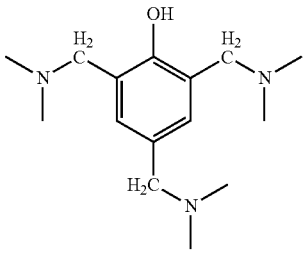 | Jiangdu Dajiang |
| monomethyl ether of hydroquinone (MEHQ) | Mn = 124.1 g/mol | | 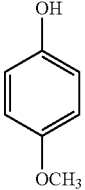 | Sinopharm |
| pheothiazine (PTZ) | Mn = 199 g/mol | | 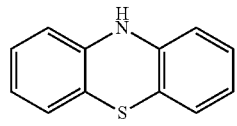 [SMILES: c1ccc2c(c1)Nc1ccccc1S2] | Sinopharm |
| M-50 (MEKP) | NA | initiator | 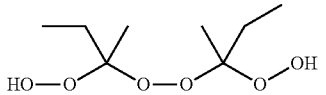 methyl ethyl ketone peroxide (MEKP) | Akzo Nobel |
| Co-10 | NA | catalyst | cobalt(II) 2-ethylhexanoate, 6% Co, in aliphatic ester | Akzo Nobel |

Test Methods

Epoxide Equivalent Weight (EEW)

The ASTM method D1652 was used. EEW is determined by reacting the epoxides with in-situ produced hydrobromic acid. Hydrobromic acid is generated by the addition of perchloric acid to excess of tetraethyl ammonium bromide. The method is a potentiometric titration, where the potential of the titrated sample is slowly increasing upon the addition of the perchloric acid until hydrobromic acid is consumed by the epoxide. After the completion of the reaction a sudden potential increase occurs and that is indicative of the amount of epoxide present.

Acid Value

The acid value was determined by using the direct titration method, with acetone or methanol to dissolve the liquid resin solution until homogenous. KOH/methanol solution was used to titrate monitored by electrode titrator. After the completion of the neutralization, a sudden potential increase occurs and that is indicated of the amount of acid value.

Glass Transition Temperature

Glass transition temperature (Tg) was measured by differential scanning calorimetry (DSC). Approximately 5-10 milligrams (mg) of sample was analyzed in an open aluminum pan on a TA Instrument DSC Q2000 fitted with an auto sampler under a $N_2$ atmosphere. Tg measurement by DSC was carried out under the following conditions: 30-250° C., 10° C./min; 2 cycles. The Tg values were read from cycle 2.

Gel Time

Gel time was measured by a set up including a fixed 50 mL cup, an agitator located exactly in the middle of the sample and connected to an electric timer.

A mixture of 30 grams (g) was charged into the cup, and the timer started to record the time as agitation started. Gel time was recorded at the point that agitation stopped due to too high viscosity developed from gelling process.

Mechanical Properties

The mechanical properties were tested on an Instron 5566 and a Resil Impactor (Ceast 6960) with following test methods:

Tensile test: ISO 527; test speed: 5 mm/min; gauge length: 50 mm.

Impact test: ISO 179; support span: 62 mm; pendulum energy: 2 J.

The mechanical property measurements were conducted with 10 specimens for each test item.

Synthesis Example 1—Synthesis of Vinyl Ester Resins (VER) 438-VER

In this Synthesis Example 1, a vinyl ester resin (VER) is prepared by the following general procedure:

The equipment used included mechanical stirring, chilling water condense pipe, and a 2 liter (L) reactor flask. D.E.N.438, 550 g, is added into the reactor and the temperature of the reactor is set at 95° C.±5° C. while the reactor contents are stirred at 200 revolutions per minute (rpm).

Then, 88 g of MAA, 1.5 g of Hycat 3000S, 3 g of DMP-30, 0.15 g of MEHQ and 0.15 g of PTZ are mixed in a separate vessel to obtain a homogeneous solution. Thereafter, the homogeneous solution is added by funnel to the reactor at 95° C. in about 1 hour (hr) and the reaction temperature of the resultant reaction mixture is maintained at less than 110° C. during the addition of the solution in a "drop-by-drop" fashion.

Another 177 g of MMA is added to the reactor at 95° C. in another 2 hr. The reaction temperature is raised to 115° C. and maintained at 115° C. for about 2-5 hr, and then a 0.2 g sample of the reaction mixture is tested to determine the acid value and EEW of the sample. The reaction mixture is tested periodically thereafter. When the acid value of the reaction mixture is less than 10 mg KOH/g and the EEW is more than 10,000, the temperature of the reaction mixture is decreased to 85° C.

In a separate vessel, 670 g of styrene is mixed with 0.15 g of MEHQ to obtain a solution. The resultant solution is then added to the reactor when the temperature is lowered to 85° C. The temperature is then allowed to decrease to room temperature (about 25° C.) and thereafter, the resultant product is poured out of the reactor into a sample bottle.

The product prepared by the above procedure is a 438-VER vinyl ester resin having an EEW of 13,190 and an acid value of 2 mg KOH/g.

Synthesis Example 2—Synthesis of 438-F202-VER

In this Synthesis Example 2, a VER is prepared using the same general procedure and equipment described in Synthesis Example 1 except that to the reactor is added 550 g of D.E.N.438 and 120 g of F202 at a reactor temperature of 95° C.±5° C. while the reactor contents is stirred at 200 rpm. Also, after adding the additional 177 g of MMA to the reactor at 95° C. in another 2 hr, the reaction temperature is maintained at 115° C. for about 2-3 hr.

The product prepared according to this Synthesis Example 2, is a 438-F202-VER vinyl ester resin having an EEW of 10,037 and an acid value of 3 mg KOH/g.

Synthesis Example 3—Synthesis of 438-CTBN-VER

In this Synthesis Example 3, a vinyl ester resin (VER) is prepared using the same general procedure and equipment described in Synthesis Example 1 except that to the reactor is added 550 g D.E.N.438 and 120 g CTBN (HY-PRO1300*8) at a reactor temperature of 95° C.±5° C. while the reactor contents is stirred at 200 rpm.

The product prepared according to this Synthesis Example 3 is a 438-CTBN-VER vinyl ester resin having an EEW of 10,001 and an acid value of 4 mg KOH/g.

Examples 1 and 2; and Comparative Examples A-E

Seven formulations: Examples 1-2 (examples of the present invention) and Comparative Examples A-E (not examples of the present invention), are prepared for performance evaluation using the formulations as described in Table II. Comparative Example A uses a vinyl ester resin (438-VER) synthesized from D.E.N.438 with methacrylic acid without the use of a toughener. Example 1 uses a vinyl ester resin (438-F202-VER) synthesized from D.E.N.438 with methacrylic acid (F202 functions as a toughener). Comparative Example B uses a vinyl ester resin (438-CTBN-VER) synthesized from D.E.N.438 and methacrylic acid (CTBN functions as a toughener). Also, MEKP is used as an initiator and Co-10 is used as a catalyst in Example 1 and Comparative Examples A and B.

When the cured product made from the formulation of Example 1 is compared with the cured products made from the formulations of Comparative Example A and Comparative Example B, the Example 1 product shows improved tensile strength, improved elongation at break and improved impact strength over the products of Comparative Examples A and B. Moreover, the Tg and acid resistance properties of the Example 1 product are excellent and acceptable in applications requiring acid resistance.

Comparative Example C is MFE 780 without the use of a toughener. Comparative Example D is a combination of MFE 780 and CTBN, wherein the CTBN is used as a toughener and is physically blended with the MFE 780. Comparative Example E is a combination of MFE 780 and FORTEGRA 100, wherein the FORTEGRA 100 is used as a toughener and is physically blended with the MFE 780. Example 2 is a combination of MFE 780 and F202, wherein F202 is used as a toughener and is physically blended with the MFE 780. Also, MEKP is used as an initiator and Co-10 is used as a catalyst in Example 2 and Comparative Examples C and D.

When the cured product made from the formulation of Example 2 is compared with the cured products made from the formulations of Comparative Example C, Comparative Example D and Comparative Example E, the Example 2 cured product shows improved tensile strength, improved elongation at break and improved significantly improved impact strength over Comparative Examples C, D and E. In addition, when the cured product of Example 1 is compared with the cured product of Example 2, the Example 1 cured product (in which the toughener is reacted into the vinyl ester resin backbone) shows an improved acid resistance performance over the Example 2 cured product. The composition of Example 1 advantageously can be used in applications wherein in the resultant cured product requires more critical acid resistance properties and can meet such acid resistance requirements. For example, the composition of Example 1 can be used in chemical tank applications.

TABLE II

Formulations and Performance Results
FORMULATIONS

| Component | Comparative Example A | Comparative Example B | Example 1 | Comparative Example C | Comparative Example D | Comparative Example E | Example 2 |
|---|---|---|---|---|---|---|---|
| MFE 780 | | | | 30 | 27.8 | 27.8 | 27.8 |
| 438-VER | 30 | | | | | | |
| 438-F202-VER | | | 30 | | | | |
| 438-CTBN-VER | | 30 | | | | | |
| FORTEGRA 202 | | | | | | | 2.2 |
| FORTEGRA 100 | | | | | | 2.2 | |
| CTBN | | | | | 2.2 | | |
| Co-10 | 0.06 | 0.06 | 0.06 | 0.1 | 0.1 | 0.1 | 0.1 |
| MEKP | 0.6 | 0.6 | 0.6 | 1 | 1 | 1 | 1 |
| Gel time (min) (30 g in small cup, gel timer) | 58 | 66 | 28 | 32 | 39 | 33 | 38 |
| Tg (° C.) | 163.9 | 164.5 | 163.4 | 168.5 | 160.3 | 157 | 167.7 |
| PERFORMANCE RESULTS | | | | | | | |
| Mechanical properties (30° C./8 hr; 80° C./8 hr; 100° C./4 hr; 140° C./2 hr) | | | | | | | |
| Tensile | | | | | | | |
| Strength at yield, MPa | 46.06 | 48.29 | 56.84 | 41 | 33 | 48.3 | 55.5 |
| Elongation at the break, % | 1.4 | 1.97 | 2.28 | 1.19 | 1.66 | 2.18 | 2.55 |
| Young's modulus, MPa | 3624 | 2879 | 2987 | 3767 | 2671 | 2913 | 2788 |
| Impact | | | | | | | |
| Impact strength, kJ/m² | 6.56 | 9.63 | 10.44 | 5.08 | 2.78 | 9.78 | 12.04 |
| Acid resistance in 80% $H_2SO_4$ (weight change in %) | | | | | | | |
| 1 Day | 0.12 | 0.125 | 0.12 | 0.11 | 0.14 | 0.2 | 0.185 |
| 3 Day | 0.19 | 0.195 | 0.2 | 0.195 | 0.255 | 0.34 | 0.275 |
| 7 Day | 0.3 | 0.29 | 0.29 | 0.295 | 0.335 | 0.5 | 0.4 |
| 28 Day | 0.62 | 0.55 | 0.61 | 0.6 | 0.74 | 1.6 | 0.77 |

The invention claimed is:

1. A vinyl ester resin formulation comprising a blend of:
   (a) at least one vinyl ester resin; and
   (b) a reactive carboxyl group terminated amphiphilic block copolymer, a reactive epoxy group terminated amphiphilic block copolymer, or a mixture thereof,
   wherein component (b) comprises at least one amphiphilic block copolymer selected from the group consisting of a carboxyl group terminated poly(ethylene oxide)-b-poly(butylene oxide), a carboxyl group terminated poly(ethylene oxide)-b-poly(butylene oxide)-b-poly(ethylene oxide), an epoxy group terminated poly(ethylene oxide)-b-poly(butylene oxide), and an epoxy group terminated poly(ethylene oxide)-b-poly(butylene oxide)-b-poly(ethylene oxide).

2. A vinyl ester resin composite product comprising a reaction product of the following reaction mixture:
   (a) the resin blend of claim 1; and
   (b) a catalyst.

3. The vinyl ester resin composite of claim 2, wherein the reaction product mixture includes further another vinyl ester resin different from the vinyl ester resin of component (a).

4. The vinyl ester resin composite of claim 2, wherein the reaction product mixture includes further a copolymerizable reactive monomer.

5. A vinyl ester resin composition comprising a reaction product of the following reaction mixture:
   (a) a polyepoxide resin;
   (b) an unsaturated carboxylic acid; and
   (c) a reactive carboxyl group terminated amphiphilic block copolymer, a reactive epoxy group terminated amphiphilic block copolymer, or a mixture thereof;
   wherein an epoxy vinyl ester resin or an unsaturated polyester resin is formed; and wherein the reactive carboxyl group terminated amphiphilic block copolymer, the reactive epoxy group terminated amphiphilic block copolymer, or a mixture thereof is reacted into the backbone of the epoxy vinyl ester resin or an unsaturated polyester resin;
   and wherein component (c) comprises at least one amphiphilic block copolymer selected from the group consisting of a carboxyl group terminated poly(ethylene oxide)-b-poly(butylene oxide), a carboxyl group terminated poly(ethylene oxide)-b-poly(butylene oxide)-b-poly(ethylene oxide), an epoxy group terminated poly(ethylene oxide)-b-poly(butylene oxide), and an epoxy group terminated poly(ethylene oxide)-b-poly(butylene oxide)-b-poly(ethylene oxide).

6. The composition of claim 5, wherein the polyepoxide resin is bisphenol A diglycidyl ether, tetrabromobisphenol A diglycidyl ether, bisphenol F diglycidyl ether, resorcinol diglycidyl ether, triglycidyl ethers of para-aminophenols, epoxy novolacs, divinylarene dioxides, or mixtures thereof.

7. The composition of claim 5, wherein the unsaturated carboxylic acid is methacrylic acid, acrylic acid, an unsaturated acid with a double bond, or mixtures thereof.

8. A vinyl ester resin composition comprising a reaction product of the following reaction mixture:

(a) a polyepoxide resin;
(b) an unsaturated carboxylic acid; and
(c) a reactive carboxyl group terminated amphiphilic block copolymer, a reactive epoxy group terminated amphiphilic block copolymer being a carboxyl group terminated poly(ethylene oxide)-b-poly(butylene oxide) or a carboxyl group terminated poly(ethylene oxide)-b-poly(butylene oxide)-b-poly(ethylene oxide), or a mixture thereof wherein an epoxy vinyl ester resin or an unsaturated polyester resin is formed; and wherein the reactive carboxyl group terminated amphiphilic block copolymer, the reactive epoxy group terminated amphiphilic block copolymer, or a mixture thereof is reacted into the backbone of the epoxy vinyl ester resin or an unsaturated polyester resin.

9. A vinyl ester resin composition comprising a reaction product of the following reaction mixture:
(a) a polyepoxide resin;
(b) an unsaturated carboxylic acid; and
(c) a reactive carboxyl group terminated amphiphilic block copolymer, a reactive epoxy group terminated amphiphilic block copolymer being an epoxy group terminated poly(ethylene oxide)-b-poly(butylene oxide) or an epoxy group terminated poly(ethylene oxide)-b-poly(butylene oxide)-b-poly(ethylene oxide), or a mixture thereof; wherein an epoxy vinyl ester resin or an unsaturated polyester resin is formed; and wherein the reactive carboxyl group terminated amphiphilic block copolymer, the reactive epoxy group terminated amphiphilic block copolymer, or a mixture thereof is reacted into the backbone of the epoxy vinyl ester resin or an unsaturated polyester resin.

10. The composition of claim 5, wherein the reaction mixture includes further a catalyst compound.

11. The composition of claim 5, wherein the concentration of the polyepoxide resin compound is from about 30 weight percent to about 50 weight percent.

12. The composition of claim 5, wherein the concentration of the unsaturated carboxylic acid compound is from about 10 weight percent to about 30 weight percent.

13. The composition of claim 10, wherein the concentration of the catalyst compound is from about 0.05 weight percent to about 2.5 weight percent.

14. A vinyl ester resin composite product comprising a reaction product of the following reaction mixture:
(a) the vinyl ester resin composition of claim 5; and
(b) a catalyst.

15. The vinyl ester resin composite product of claim 14, wherein the reaction product mixture includes further another vinyl ester resin different from the vinyl ester resin composition of claim 5.

16. The vinyl ester resin composite product of claim 14, wherein the reaction product mixture includes further a copolymerizable reactive monomer.

17. The vinyl ester resin composite product of claim 16, wherein the copolymerizable reactive monomer is styrene.

18. The vinyl ester resin composite product of claim 14, wherein the composite product exhibits an increase in tensile strength, an increase in elongation at break, an increase in impact strength; and an increase in acid resistance, without exhibiting a substantial decrease in glass transition temperature.

19. A process for preparing a vinyl ester resin composition comprising reacting:
(a) a polyepoxide resin;
(b) an unsaturated carboxylic acid;
(c) a reactive carboxyl group terminated amphiphilic block copolymer, a reactive epoxy group terminated amphiphilic block copolymer, or a mixture thereof;
wherein component (c) comprises at least one amphiphilic block copolymer selected from the group consisting of a carboxyl group terminated poly(ethylene oxide)-b-poly(butylene oxide), a carboxyl group terminated poly(ethylene oxide)-b-poly(butylene oxide)-b-poly(ethylene oxide), an epoxy group terminated poly(ethylene oxide)-b-poly(butylene oxide), and an epoxy group terminated poly(ethylene oxide)-b-poly(butylene oxide)-b-poly(ethylene oxide);
wherein an epoxy vinyl ester resin or an unsaturated polyester resin is formed; and wherein the reactive carboxyl group terminated amphiphilic block copolymer, the reactive epoxy group terminated amphiphilic block copolymer, or a mixture thereof is reacted into the backbone of the epoxy vinyl ester resin or an unsaturated polyester resin; and
(d) optionally, a catalyst.

20. A cured thermoset article prepared by the process of claim 19.

* * * * *